(12) United States Patent
Dittmer-Roche

(10) Patent No.: US 10,381,041 B2
(45) Date of Patent: Aug. 13, 2019

(54) SYSTEM AND METHOD FOR AUTOMATED VIDEO EDITING

(71) Applicant: Shimmeo, Inc, New York, NY (US)

(72) Inventor: Bjorn Michael Dittmer-Roche, New York, NY (US)

(73) Assignee: Shimmeo, Inc., New York, NY (US)

( * ) Notice: Subject to any disclaimer, the term of this patent is extended or adjusted under 35 U.S.C. 154(b) by 0 days.

(21) Appl. No.: 15/044,272

(22) Filed: Feb. 16, 2016

(65) Prior Publication Data
US 2017/0236549 A1     Aug. 17, 2017

(51) Int. Cl.
| | | |
|---|---|---|
| *G11B 27/028* | (2006.01) | |
| *G06F 16/74* | (2019.01) | |
| *G11B 5/265* | (2006.01) | |
| *H04N 5/262* | (2006.01) | |
| *H04N 9/74* | (2006.01) | |
| *H04N 5/265* | (2006.01) | |
| *G11B 27/031* | (2006.01) | |
| *G11B 27/10* | (2006.01) | |
| *G11B 27/28* | (2006.01) | |
| *H04N 5/76* | (2006.01) | |

(52) U.S. Cl.
CPC .......... *G11B 27/028* (2013.01); *G06F 16/745* (2019.01); *G11B 27/031* (2013.01); *G11B 27/10* (2013.01); *G11B 27/28* (2013.01); *H04N 5/262* (2013.01); *H04N 5/265* (2013.01); *H04N 5/76* (2013.01); *H04N 9/74* (2013.01)

(58) Field of Classification Search
USPC .............. 386/200–234, 239–248, 278–290
See application file for complete search history.

(56) References Cited

U.S. PATENT DOCUMENTS

| | | |
|---|---|---|
| 5,654,737 A | 8/1997 | Der et al. |
| 5,929,836 A | 7/1999 | Der et al. |
| 6,704,671 B1 | 3/2004 | Umminger, III |
| 7,027,124 B2 | 4/2006 | Foote et al. |
| 7,301,092 B1 | 11/2007 | McNally et al. |
| 7,716,572 B2 | 5/2010 | Beauregard et al. |
| 8,306,399 B1 | 11/2012 | Trottier et al. |
| 8,347,210 B2 | 1/2013 | Ubillos et al. |
| 8,381,086 B2 | 2/2013 | Li et al. |
| 8,401,683 B2 | 3/2013 | Maxwell et al. |
| 8,586,847 B2 | 11/2013 | Ellis et al. |
| 8,661,096 B2 | 2/2014 | Chou |
| 9,032,297 B2 | 5/2015 | Lovejoy et al. |
| 9,129,640 B2 | 9/2015 | Hamer |

(Continued)

OTHER PUBLICATIONS

Juan Pablo Bello et al., *A Tutorial on Onset Detection in Music Signals*, IEEE Transactions on Speech and Audio Processing, 2005, 1-13.

*Primary Examiner* — Hung Q Dang
(74) *Attorney, Agent, or Firm* — Haug Partners LLP

(57) ABSTRACT

A system and method for automated video editing. A reference media is selected and analyzed. At least one video may be acquired, and thereby synced to the reference audio media. Once synced, audio analysis is used to assemble an edited video. The audio analysis can include information, including user inputs, video analysis, and metadata. The system and method for automated video editing may be applied to collaborative creation, simulated stop motion animation, and real-time implementations.

3 Claims, 13 Drawing Sheets

(56) References Cited

U.S. PATENT DOCUMENTS

| | | | |
|---|---|---|---|
| 2003/0160944 A1* | 8/2003 | Foote | G03B 31/00 |
| | | | 352/1 |
| 2006/0120225 A1 | 6/2006 | Choi | |
| 2007/0180980 A1 | 8/2007 | Kim | |
| 2008/0034947 A1* | 2/2008 | Sumita | G10H 1/383 |
| | | | 84/613 |
| 2009/0196570 A1 | 8/2009 | Dudas et al. | |
| 2011/0026898 A1 | 2/2011 | Lussier et al. | |
| 2011/0230987 A1 | 9/2011 | Anguera Miró et al. | |
| 2012/0189284 A1* | 7/2012 | Morrison | G06F 17/30265 |
| | | | 386/282 |
| 2013/0163963 A1* | 6/2013 | Crosland | H04N 9/8211 |
| | | | 386/285 |
| 2013/0330062 A1 | 12/2013 | Meikle et al. | |
| 2015/0149906 A1 | 5/2015 | Toff et al. | |
| 2016/0088407 A1* | 3/2016 | Elmedyb | H04R 25/405 |
| | | | 381/23.1 |

\* cited by examiner

400

600

800

Figure 9
Figure 9A: finding interesting times in video media by edge detection
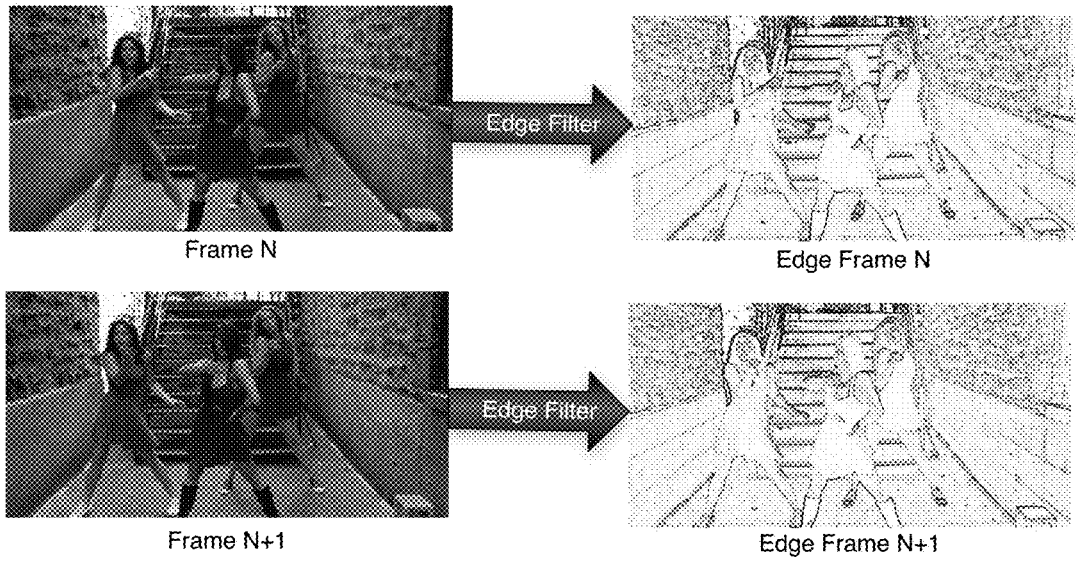
Figure 9B: finding interesting times in video media by analyzing overall change
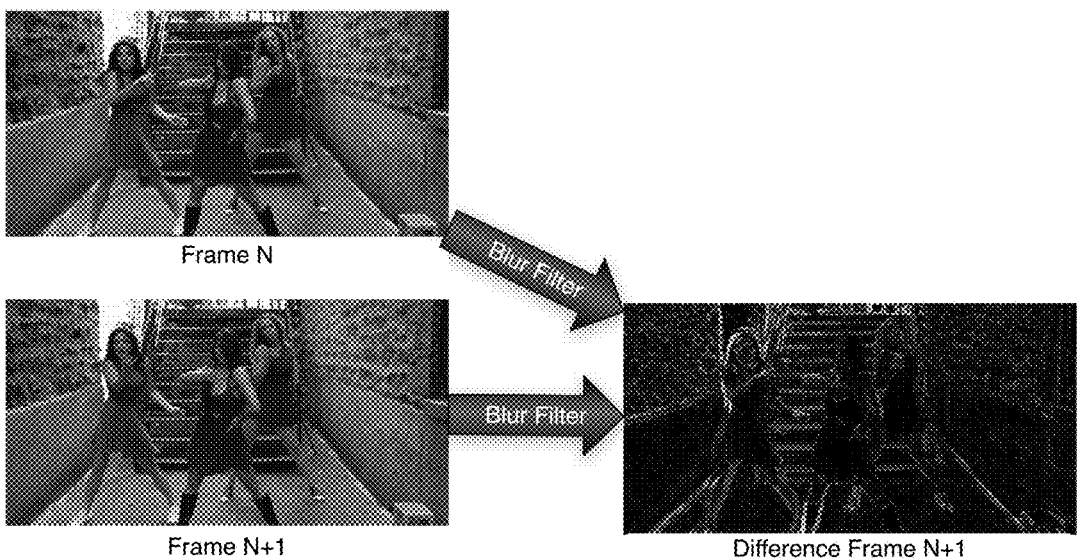

Figure 10
1000
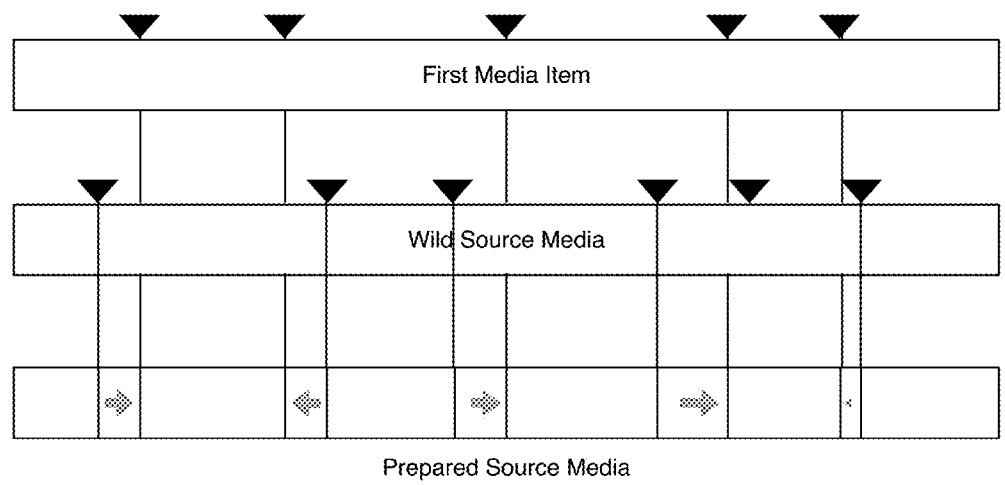
 = Time scale (stretch or compress)
 = Onset or "Interesting Frame"

Figure 13
1300
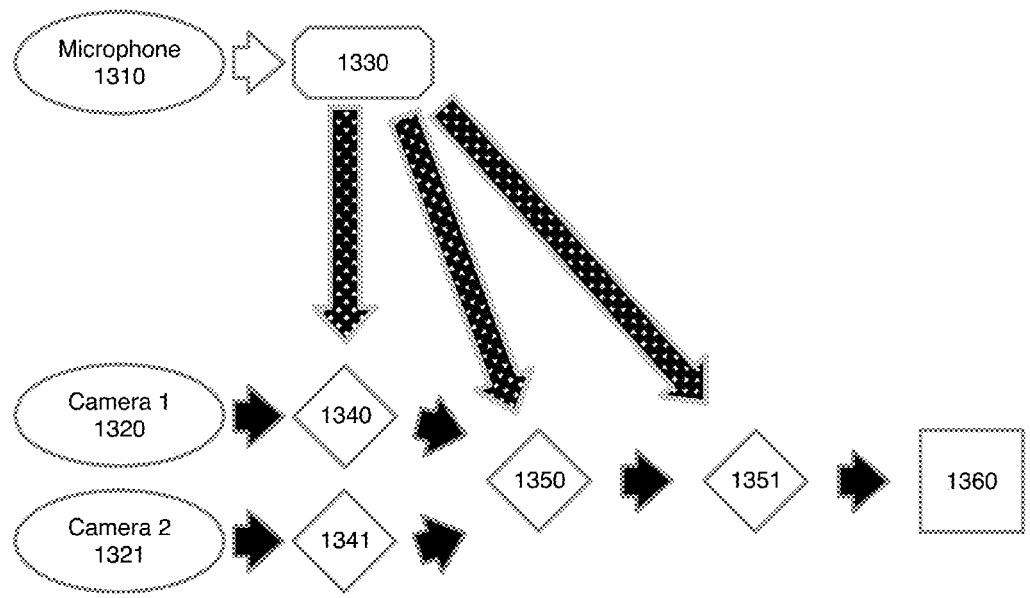
  Audio Analysis, such as that performed in FIG 3 and Fig 4
  Video or Audio Source, e.g. Camera or Microphone
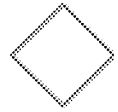  Video Filter or Effect
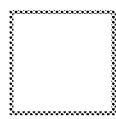  Video Output, e.g. Screen or Video recorder
 = Control Signal Path
 = Audio Signal Path
 = Video Signal Path

SYSTEM AND METHOD FOR AUTOMATED VIDEO EDITING

FIELD OF THE INVENTION

The present invention relates to editing videos in an automated fashion. Specifically, the invention relates to a system and method for creating a single, composite video from one audio source and at least one video source without the need for user interaction. Additionally, the invention is primarily concerned with the process of automated editing on mobile devices.

BACKGROUND OF THE INVENTION

Historically, video editing systems were clumsy and complicated, requiring many steps to derive a composite video from a set of source media. Film editing systems, such as Moviolas, physically spliced film together in a destructive manner. Tape-based video editing systems required at least two sources and a destination video player, and complex hardware to keep the systems synchronized. In both these systems, once a section of video was edited, it was very difficult to go back and make further changes.

Modern, computer-based video editing systems, such as Avid®, iMovie®, and Premiere®, allow users to easily undo and modify editing decisions, but still require human intervention for each decision. A user must review the source material (e.g., any media content that is available to create a composite video), selecting start and end times in each source clip (often called "in" and "out" points) to create a trimmed clip (e.g., a portion of a media item). Then, the user must select a time in the final composite video that the source clip should be played. Optionally, the user may select effects, such as cross-dissolves, color changes, titles and so on, to apply to either the source media or the final composite video. Once these decisions are made, the video editing system can produce an Edit Decision List, or EDL, which specifies these decisions. "Offline" systems, such as Avid®, can produce a preview of the video from the EDL and low-quality versions of the source material. The EDL can then be used to "render" a full-quality version of the video. "Online" systems can produce full-quality version of video immediately. This final and full version, or composite video, is the video created by combing the trimmed clips.

Music Videos

Music videos are videos designed to accompany a song or other musical content. They are generally designed to enhance the experience of listening to a song. The process of making music videos is an art with different requirements from those of a standard videos. Specific planning must be performed while creating the source media to ensure that sufficient timing information exists to allow the editor to create a composite video that contains elements that properly correspond to the musical content. While a great many techniques exist to accomplish this task, most music videos are created using the following process: 1. A song is selected. 2. the song is played back while video is recorded while performers in the video time their actions to the music (e.g., by dancing to the beat or lip-syncing). In some cases, the video recording system is carefully synchronized to the audio using a variety of complex technologies, including time-code (e.g., SMPTE), blackburst, and so on, so that differences in playback and recording speeds do not cause the audio and video to drift during playback later. In practice, the speed of audio and video may be close enough that they do not need to be synchronized. 3. Timing information is recorded so that the video and song can be synchronized later. This is often done with a standard film slate. 4. The editor synchronizes all the video and audio using editing software by using the recorded timing information. The video and audio are considered synchronized when they are played back substantially simultaneously, or are scheduled to be played back simultaneously. 5. The editor proceeds as with a standard video, careful to maintain the synchronization between the audio and video. Steps 2 and 3 may be repeated to create additional source video.

In addition to ensuring that the video and audio remain synchronized, the editor must take care to ensure that the edit points, such as transitions from one video to another, and visual effects, occur at musically relevant times. This takes skill, experience, and trial and error. In practice, it is not as simple as creating edits at the downbeats—edits in modern music videos occur at times that are musically relevant, but usually not the main downbeats.

Methods have been proposed for analyzing music to determine musically relevant times automatically. These methods include "onset" detection, such as the onset detection used as a first step in beat detection and audio fingerprinting algorithms. However, existing techniques do not find times that correspond to edit locations in music videos. This may be for several reasons: 1. By design, many onset detection algorithms are optimized to find downbeats, which generally do not correspond to times that a professional video editor would use to edit a video. 2. Many onset detection algorithms do not perform well without manually setting a parameter, such as a threshold parameter, 3. Many onset detection algorithms do not perform well with modern commercial recordings, which typically have very low dynamic range, or a wide variety of source material.

For example, U.S. Pat. No. 6,704,671 to Umminger, III teaches determining sonic events within an audio signal. In order to determine these events, the volume of the audio signal is tracked and a determination is made based on a rate of change of the volume. However, the method utilized by Umminger is ill suited for editing videos because a change in volume will not pick up all relevant onsets.

Additionally, U.S. Pat. No. 8,586,847 to Ellis et al. teaches a method for fingerprinting a music sample using a single low pass filtering technique. This technique only detects onsets in a specific frequency range. However, this technique requires additional logic to continuously adapt to changing dynamics in the music. The technique is silent as to determining onsets in a given frame of an audio signal. Thus, the method utilized by Ellis is not applicable to video editing because frame onsets cannot be determined.

It is possible to create special effects, such as slow motion and fast motion but still maintain synchronization. For example, if a slow motion effect is desired, say playback at half speed, the process must be changed as follows: in step 2 the song is played back at twice the original speed, and the video is recorded at twice the required frame-rate. During step 4, the editor must slow down the video so that it is synchronized with normal audio playback.

In some cases, video may be used that was not created in the above manner, and is therefore not synchronized. This video is called "wild" video, or video that has no timing reference and thus no existing metadata which can be used to synchronize it with other media. When using wild video, the editor may choose to create the illusion of synchronization by changing the playback speed and/or adjusting the start time. This is a time-consuming and tedious process which requires a great deal of trial and error. Moreover, such a process only gives the illusion of synchrony, and does not actual synchronize the video.

For example, U.S. Pat. No. 8,347,210 to Ubillos et al. teaches a method of synchronizing video with beats of an audio track. However, Ubillos requires a user to manually synchronize the video and audio and is silent as to any means for automatic detection.

In practice, the entire editing process is time consuming and often requires much trial and error, as well as manual inspection of source media to determine what is most appropriate. Selecting source media, start, end, and insertion times to produce a compelling video is both an art and a complex discipline requiring much attention to detail. Even with an experienced operator and the most sophisticated equipment it can be time consuming.

As an example, U.S. Patent Pub. No 2015/0149906 to Toff et al. teaches creating a collaborative video from video clips derived from different users. However, Toff does not contemplate any type of automatic editing or synchronization. Moreover, the editing is accomplished manually, in that the users select the start and end times, order, and other properties of the video clips.

Additionally, it is desirable to reduce the amount of bookkeeping required to maintain synchronization between the audio and video and make it easier to synchronize wild video. The present invention addresses this issue as well.

Moreover, it is desirable to create a method and system for detecting onsets that works with a variety of music styles and recording techniques without requiring human intervention and produces results that are consistent with editing times in music videos currently being produced by humans.

BRIEF SUMMARY

One aspect of the invention provides techniques for editing video that requires little to no user intervention. It is a further aspect of the invention to provide a family of techniques that can be used to reduce or eliminate the need for user intervention during the editing of media, more specifically videos. It is a further aspect of the invention to provide a mobile application for carrying out the media editing. If minimal user intervention is desired, such as selecting a cinematic style to emulate, a wide variety of composite videos can be created. A further aspect of the invention is to provide a mobile application for the creation and editing of music videos.

According to an embodiment of the invention, there is provided a method for determining media onsets comprising obtaining a first media item and partitioning it into a plurality of frames, converting information from within the plurality of frames from the time domain into the frequency domain, determining a magnitude, in the frequency domain, for each frequency band within each frame, filtering each magnitude using a first set of filters and a second set of filters, determining an onset has occurred within a frequency band of each of the plurality of frames by comparing outputs of the first and second set of filters, and determining an onset has occurred within a frame of the plurality of frames based in part on the determination that at least one onset has occurred within a frequency band of that frame by the comparison of the outputs of the first and second set of filters.

According to another embodiment of the invention, there is provided a method for editing media comprising determining a plurality of onsets within a first media item, obtaining and recording a plurality of second media items, partitioning the plurality of second media items based upon the plurality of onsets from the first media item, and creating a composite media file by selecting and combining in series a plurality of the partitions from the plurality of second media items based at least in part upon the determined onsets.

According to yet another embodiment of the invention, there is provided a method for synchronizing video comprising obtaining a video media item having a first length of time, determining onsets or interesting times within said video media item at specific times within the first length of time, partitioning the video media item into a plurality of partitions based upon said onsets or interesting times, obtaining a first media item having a second length of time, determining a plurality of onsets within the first media item, and adjusting a length of time of at least one of the plurality of partitions of the video media item so that onsets from the first media item match, in time, with onsets or interesting times of the video media item According to yet another embodiment of the invention, there is provided a method for editing source media into a composite video and applying effects using an existing edit decision list (EDL) comprising partitioning source media based on the information in the EDL, sorting the partitioned source media into two or more intermediate tracks, combining, upon playback, the intermediate tracks in series or using a blend visual effect, and applying, upon playback, one or more visual effects to at least one item selected from the group consisting of: the partitioned source media; the two or more intermediate tracks; and the combined video

BRIEF DESCRIPTION OF DRAWINGS

The following description, given by way of example and not intended to limit the invention to the disclosed details, is made in conjunction with the accompanying drawings, in which like references denote like or similar elements and parts, and in which:

FIG. 9 is an illustration of the first steps in a method of synchronizing "Wild" source media to a reference track, according to an embodiment of the invention;

FIG. 10 is an illustration of a method of synchronizing "Wild" Source Media to a Reference Track according to an embodiment of the invention;

FIG. 13 is an illustration of a system for performing automatic video editing in real-time according to an embodiment of the invention.

DETAILED DESCRIPTION OF CERTAIN ILLUSTRATIVE EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

Embodiments of the invention are described below with reference to the accompanying drawings. It is to be understood, however, that the invention encompasses other embodiments that are readily understood by those of ordinary skill in the field of the invention. Also, the invention is not limited to the depicted embodiments and the details thereof, which are provided for purposes of illustration and not limitation.

Unless the context requires otherwise, throughout the specification and claims which follow, the word "comprise" and variations thereof, such as "comprises" and "comprising," are to be construed in an open, inclusive sense, that is, as "including, but not limited to." Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The section headings provided herein are for convenience only and do not alter or limit the scope or meaning of the embodiments of the present disclosure.

Description of an Example Mobile Computer System

Figure 1:
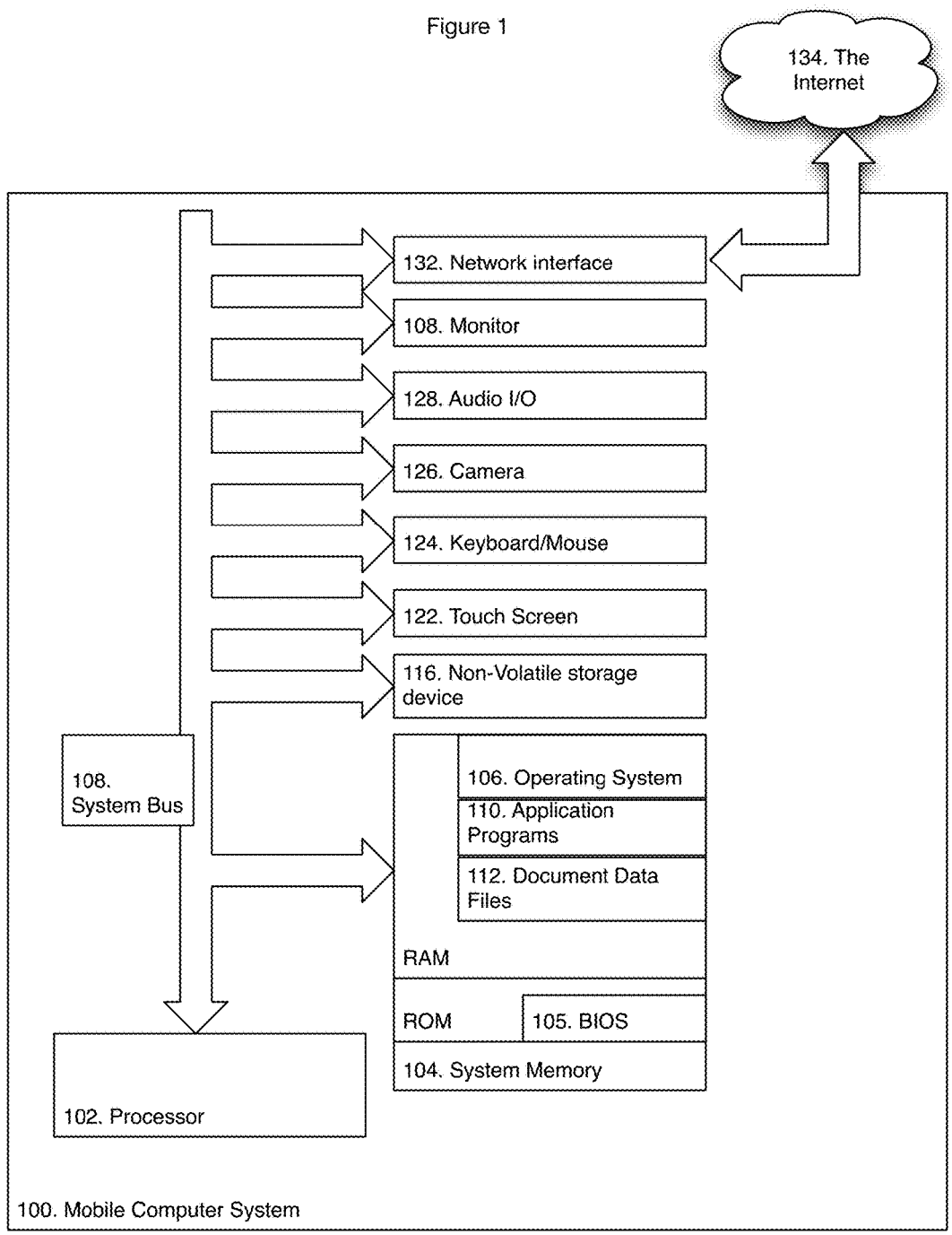
FIG. 1 is an illustration of a mobile computer system configured for filming and automatically editing video, according to an embodiment of the invention.

FIG. 1 shows a mobile computer system 100 in accordance with an embodiment of the present invention, which comprises a mobile computer configured for filming and editing video documents. The mobile computer system 100 may take the form of a conventional PC, which includes processor 102, system memory 104 and system bus 108 that couples various system components including the system memory 104 to the processing unit 102. The mobile computer system 100 will at times be referred to in the singular herein, but this is not intended to limit the embodiments to a single computing device, since in certain embodiments, there will be more than one networked computing device involved. Furthermore, the present disclosure is not limited to a mobile computer system, (mobile phones, handheld devices, mobile "tablet" computers, etc.). However, mobile computer systems (also called "mobile devices") provide a common and rich set of features which are particularly advantageous for embodiments of the present invention. Those skilled in the relevant art will appreciate that the illustrated embodiments, as well as other embodiments, can be practiced with other computer system configurations, such as desktop, or "personal" computers ("PCs"), network PCs, embedded systems, "set top boxes," multiprocessor systems, microprocessor-based or programmable consumer electronics, or custom-built devices and the like.

Embodiments of the invention can be practiced in distributed computing environments where tasks or modules are performed by remote processing devices, which are linked through a communications network. In a distributed computing environment, program modules may be located in both local and remote memory storage devices. The communications network need not be a traditional communications network, such as the internet. According to an aspect of the invention, it could, for example, be a hard drive or other data storage system that is physically transported and connected to one device after another as required The processor 102 may include any logical processing unit, such as one or more central processing units (CPUs), digital signal processors (DSPs), application-specific integrated circuits (ASICs), field programmable gate arrays (FPGAs), Graphics Processing Units (GPUs), etc. The system bus 108 can employ any known bus structures or architectures, including a memory bus with memory controller, a peripheral bus, and a local bus. The system memory 104 may include read-only memory ("ROM") and random access memory ("RAM"). A basic input/output system ("BIOS") 105, which can form part of the ROM, contains basic routines that may help transfer information between elements within the mobile computer system 100 (e.g., during start-up).

The mobile computer system 100 may also include non-volatile storage device 116 such as a hard disk drive or a flash memory drive in accordance with an embodiment of the present invention. Though not shown, the mobile computer system 100 may further or alternatively include other storage devices, such as additional flash memory drives and/or optical disk drives. The non-volatile storage device 116 communicates with the processor 102 via the system bus 108. The non-volatile storage device 116 may include interfaces or controllers (not shown) coupled between the non-volatile storage device 116 and the system bus 108. Non-volatile storage device 116, and its associated computer-readable media (if any) may provide non-volatile storage of computer-readable instructions, document data files 112, program modules and other data for the mobile computer system 100. A variety of program modules can be stored in the system memory 104, including an operating system 106 and one or more application programs 110. According to an aspect of the present invention, the application programs 110 may provide much of the functionality described below with reference to FIGS. 2 through 13. While shown in FIG. 1 as being stored in the system memory 104, the operating system 106, application programs 110, and document data files 112 may be stored in a nonvolatile storage device 116, or on the network (not shown) or even in the hardware itself. Additionally, document data files 112, or other information may be stored in multiple places, and/or copied from one location to another as is most convenient. One skilled in the relevant art will appreciate that this is just one possible organization of data in a mobile computer system.

A user can enter commands and information into the mobile computer system 100 using a variety of input methods. These methods include a touch screen 122, a keyboard and mouse 124, and a camera 126. Other input devices include a microphone, musical instruments, a scanner, a camera, etc. . . . According to an embodiment of the present invention, one or more of these input devices may be used in order to interact with, edit and create the document data 112. According to one aspect of the invention, these and other input devices are connected to the processor 102 through an interface such as a universal serial bus ("USB") interface that couples to the system bus 108, although other interfaces such as another serial port, a game port or a wireless interface may also be used. According to another aspect of the invention, the input devices may also be coupled to the system bus directly as shown in FIG. 1. The mobile computer system 100 may further include an audio I/O interface 128, such as a sound card. The audio I/O interface 128 enables a user to import audio from an external source, and/or play audio on one or more speakers. A monitor or other display device may be coupled to the system bus 108 via a video interface, such as a video adapter (not shown). The monitor or display device is configured to display media content stored on the mobile computer system 100 in addition to media content retrieved over a network.

According to an embodiment of the present invention, the mobile computer system 100 can include other output devices, such as printers. In such an embodiment, the mobile computer system 100 operates in a networked environment using one or more logical connections to communicate with one or more remote computers or other computing devices. These logical connections may facilitate any known method of permitting computers to communicate, such as through one or more LANs and/or WANs, such as the Internet 134. According to one aspect of the invention, a network interface 132 (communicatively linked to the system bus 108) may be used for establishing communications over the logical connection to the Internet 134. In a networked environment, program modules, application programs, or documents, or portions thereof, can be stored outside of the mobile computer system 100 (not shown). Those skilled in the relevant art will recognize that the network connections shown in FIG. 1 are only some examples of ways of establishing communications between computers, and other connections may be used.

Synchronizing Video

Figure 2:
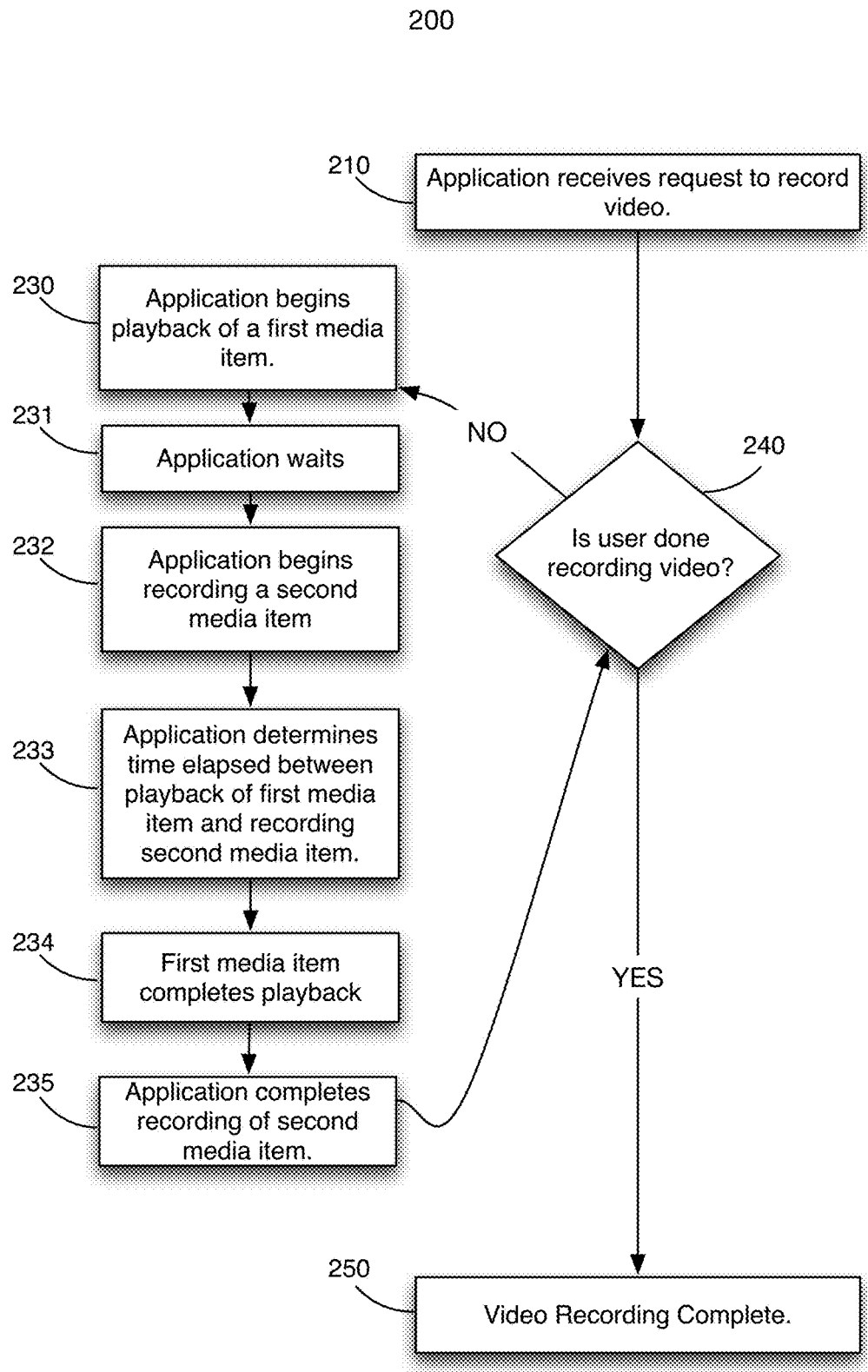
FIG. 2 is a process flow diagram for a method for filming multiple videos synchronized to a media item.

FIG. 2 shows an embodiment of a process by which media is generated and synchronized to existing media on a mobile device. When an application receives a request to record media 210, it first checks to see if the user is done recording media 240. According to an aspect of the present invention, this check is accomplished via input from the user. Alternatively, it may be accomplished by an automatic method, such as determining if there are at least some number of media already recorded. If the user is done, the process completes 250.

Otherwise, the application begins playback of the first media item 230 which acts as reference media. Reference media may be any media used as a timing or sync reference against other media. This first media item may be audio or video media. According to an aspect of the invention, and in the case of making a music video, the first media item is audio media. Once the first media item has begun playing back, the application may wait 231, and begin recording second media item 232. According to the aforementioned aspect of the present invention, and in the case of a music video, the second media item 232 is video media. Subsequently, a determination is made as to how much time elapsed between playback of the first media item and recording of the synchronized second media item 233. Without this step, future synchronization cannot be accomplished. According to an aspect of the present invention, recording of the second media item may begin before playback of the first media item, in which case the time elapsed is negative. The time elapsed may be estimated as the length of time the application waited in step 231. According to an embodiment of the present invention, playback and recording occur sufficiently simultaneously, in which case the elapsed time may be calculated to be zero. After the first media item completes playback 234, the application will complete recording of the second media item 235. According to an embodiment of the present invention, steps 234 and 235 may be reversed or occur sufficiently simultaneously.

Once completed, the calculated elapsed time enables playback of the first and second media items in sync. According to an aspect of the invention, this is accomplished by scheduling playback of the second media item to begin at the same time as the first media item plus the elapsed time. This elapsed time may be considered a "playback offset."

According to an embodiment of the present invention, the user or software may change the playback and recording speed to create slow motion or fast motion effects as described above.

Audio Analysis

According to an embodiment of the present invention, a plurality of second media items (e.g., video) are synchronized to a single first media item (e.g., a source of audio). That is, the first media item acts as a reference track for a plurality of videos.

Figure 3:
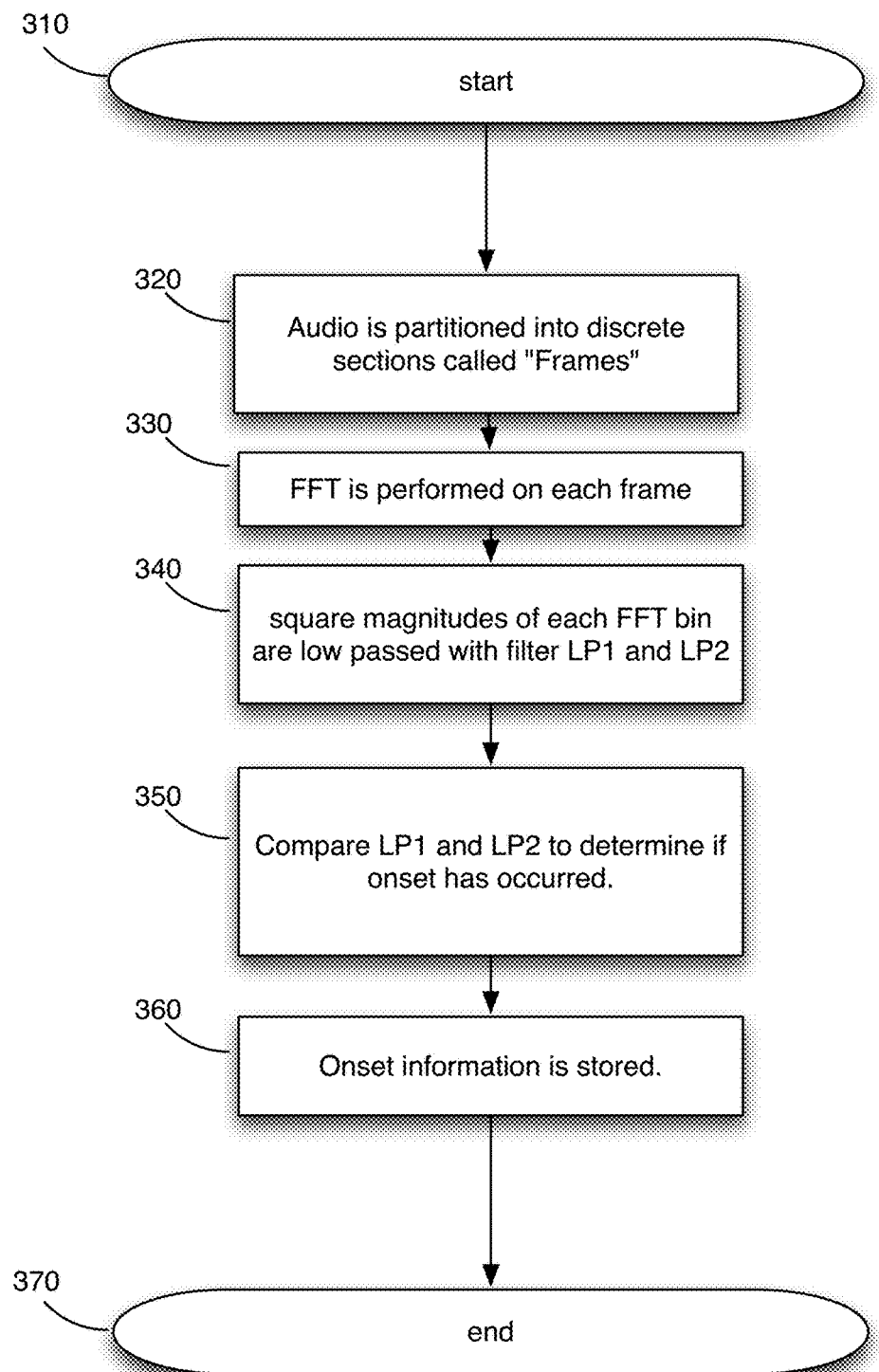
FIG. 3 is a process flow diagram for a method for audio onset detection according to an embodiment of the invention.

FIG. 3 shows a technique for onset detection within a media item according to an aspect of the present invention. Starting point 310 is typically when the application receives a request to analyze audio of a media item. At 320, the audio is partitioned into discrete chunks, or "frames." To ensure ease of analysis, a frame-size that is a power of 2 may be used according to an aspect of the present invention. Each frame is sufficiently small to ensure that the necessary timing resolution is achieved, and sufficiently large to represent a possible onset. For example, for editing video at 30 frames per second and audio at 44100 samples per second, frames may be as large as 1024 samples. According to an aspect of the present invention, the frames may contain overlapping samples, rather than being discretely partitioned.

At 330, a FFT (Fast Fourier Transform) is performed on each frame, converting data points within each frame from the time domain into the frequency domain. According an aspect of the invention, a window function may be applied first. The square magnitude of the FFT in each frequency band is calculated and the results are stored.

At 340, the square magnitudes of the results of each frequency band are low passed with two different sets of filters, LP1 and LP2. According to an aspect of the invention, LP1 decays faster than LP2. The low pass filters may be of any type, including moving average, Butterworth, etc. For efficiency, a simple exponential decay filter may be used.

At 350, it is determined if an onset occurs on each frame. First, the output of LP1 and LP2 are compared. If LP1 is sufficiently larger than LP2, it is determined that an onset has occurred in that band. For example, on onset in a given band may be identified when LP1 is between 1.2 and 2.5 times greater than LP2. Secondly, a determination is made as to how many onsets have occurred within a given frame. If onsets have occurred in a sufficient number of frequency bands, it is determined that an onset has occurred at that time. For example, an onset may be determined when more than 50% of all bands have, individually, detected an onset in that frame.

At 360, the onset information from steps 340 and 350 is stored. According to another aspect of the present invention, when processing occurs in real-time, it is not necessary to store the information because the data is processed and used immediately.

At 370 the process completes.

According to aspects of the present invention, additional data, such as the RMS (root mean square) value of the sample, and/or higher order statistics are calculated and stored for each frame and/or onset (not shown).

Figure 4:
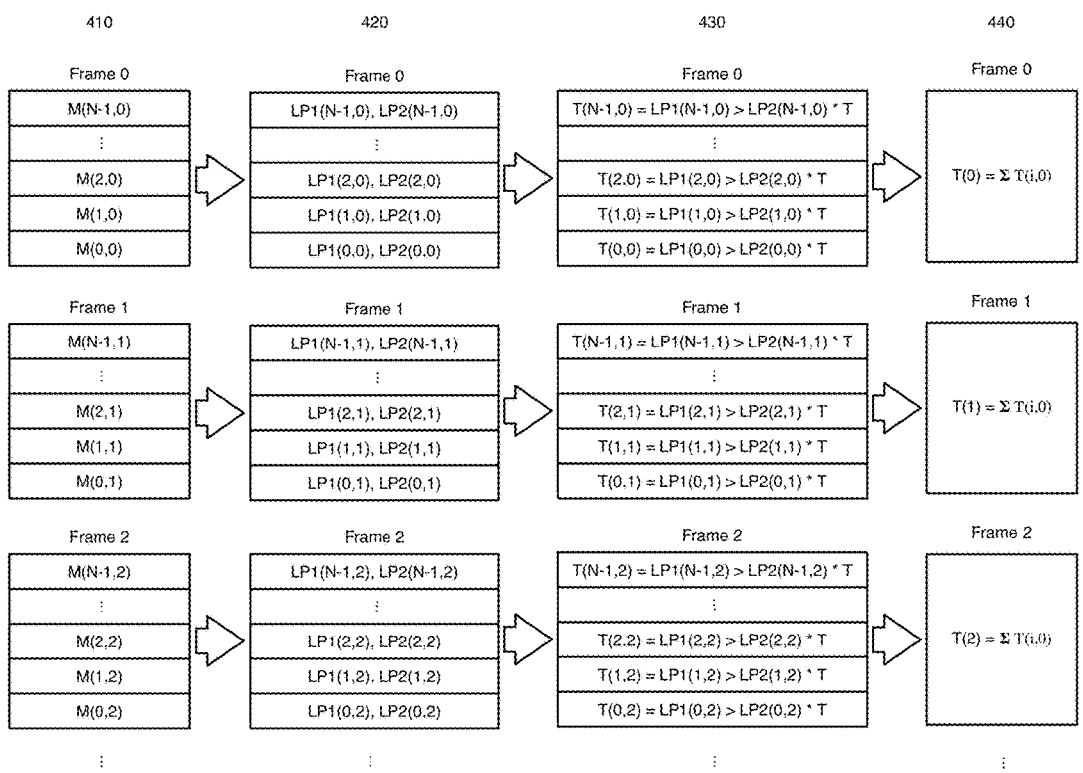
FIG. 4 is an illustration of a system performing audio onset detection according to an embodiment of the invention.

FIG. 4. shows part of the process previously shown in FIG. 3. with additional detail. At 410 the results of the FFT of each frame have been acquired. The square magnitude of the i'th bin and j'th frame is denoted M(i,j). This is analogous to step 330 from FIG. 3, except that the square magnitude has already been calculated. At 420, the results from 410 have been processed using the two sets of low-pass filters, LP1 and LP2. One filter from the LP1 set and one filter from the LP2 set is applied to each bin. Thus, with N bins, there are 2N filters. The output the LP1 filter set for the i'th bin and j'th frame is notated LP1(i,j). Similarly, the output the LP2 filter set for the i'th bin and j'th frame is notated LP2(i,j).

At 430, it is determined which bins LP1 are significantly greater than LP2 (e.g., by at least a factor "T". T may be, for example, between 1.2 and 2.5). The result of this comparison, which is 1 if true and 0 if false, is denoted T(i,j). At 440, summing over all bins in T(i,j) occurs for each frame to get T(j). If T(j) is large enough for frame j, it is determined that an onset has occurred. For example, if there are 256 bands, an onset may be considered to have occurred when T(j) is greater than, for example, 128. According to an aspect of the present invention, an onset may be ignored, for example, if another onset has occurred recently, for example, within the last 10 frames.

Automatic Editing

Figure 5:
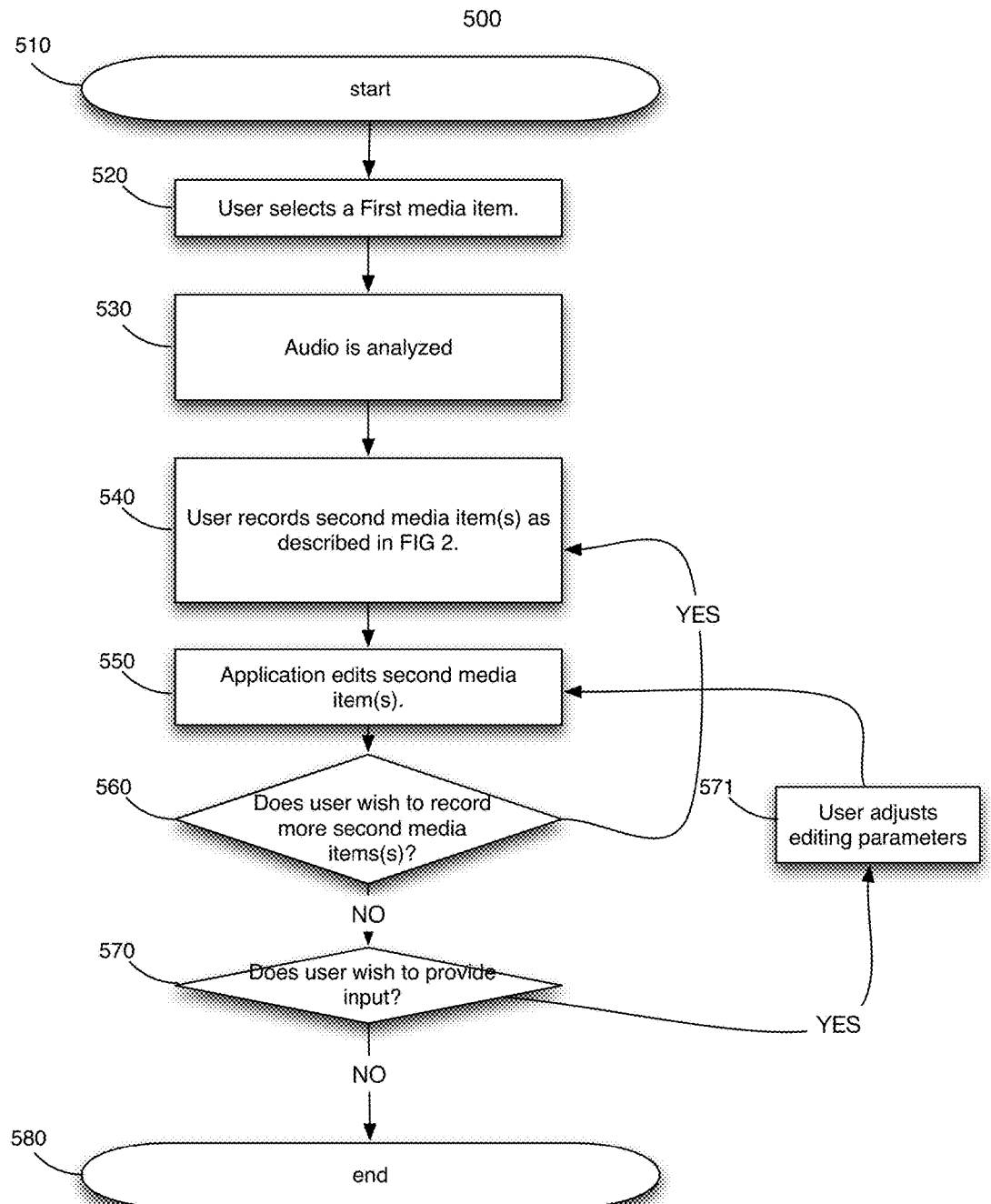
FIG. 5 is a process flow diagram for a method for automated video editing according to an embodiment of the invention.

FIG. 5. shows the process of creating a music video according to an embodiment of the present invention. At 520, the user selects an audio media item to serve as the first media item (e.g., reference media). According to an alternative embodiment of the present invention, it possible that this first media item is selected indirectly, or by an entity other than the user. For example, audio media may be the only media packaged with a particular application. According to other embodiments of the present invention, the selection may be made by the application, for example, by selecting a first media item at random from a list. In real-time embodiments (not shown), the first media item may be a "stream" of data being received continuously over a network.

At 530, audio from the first media item is analyzed. According to an embodiment of the present invention, the audio is analyzed according to the steps of FIGS. 3 and/or 4. According to an alternative embodiment of the present invention, the audio may be analyzed using other means for onset detection, for example, amplitude-based detection. According to yet another embodiment, the audio may have been analyzed already, possibly by a third party.

At 540, one or more second media items (e.g., video items) are recorded as described in FIG. 2, using the audio from the first media item as reference media. The one or more second media items are all synchronized to the audio from the first media item, and therefore to each other.

At 550, the application edits the recorded second media items and combines them with the first media item (e.g., the selected audio) using information from the audio analysis of step 530. This process will be described in more detail below with regard to FIG. 6-7.

At 560, the user is given the option to return to step 540 to record additional second media items (e.g., more videos). According to an embodiment of the present invention, this decision is made in an automated fashion, for example, by the application, rather than at the request of the user. In such an embodiment, the application may analyze the resulting, edited, composite video (discussed below), and determine that the results are poor for some reason (e.g., a variety of textures in the second media item(s) does not correspond to a variety of textures in the first media item, or the overall quality of the second media items is low), and return to recording additional second media items automatically.

At 570, the user is given the opportunity to provide feedback. This allows the user to adjust some parameters at 571. After adjusting the parameters, the application re-edits the composite video at 550. The user may also adjust some parameters having to do with the effects that are applied when the video is played back. Video effects will be discussed further with regard to FIG. 8. According to an aspect of the present invention, the application may adjust parameters automatically based on analysis of the output video, instead of, or in addition to, allowing the user to edit those parameters. For example, the application can include a facial detection module that determines that faces are not as clearly visible in the output video, and also determines that the input video contained clearly visible faces. In such a situation, the application may change some of the editing parameters to include more clearly visible faces.

Figure 6:
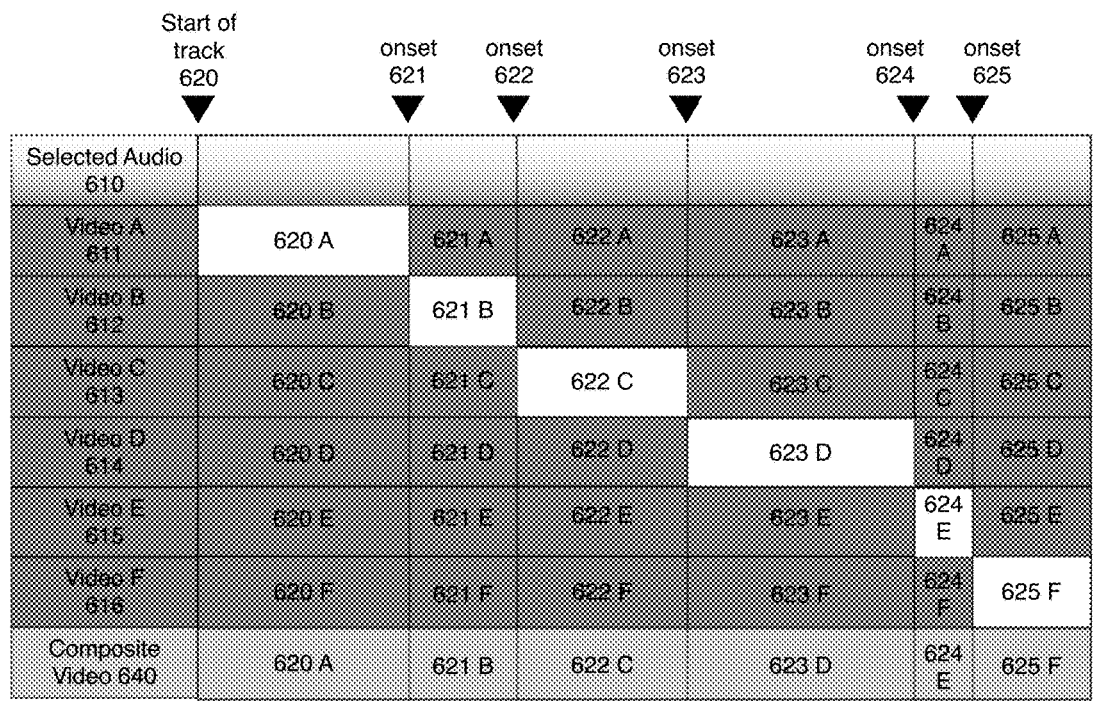
FIG. 6 is an illustration of an EDL being made from the selections of video according to an embodiment of the invention.

FIG. 6 shows an example of the selected audio (e.g., the first media item), 610, with 6 synchronized videos (e.g., second media items), 611-616 according to an embodiment of the present invention. The audio has been analyzed to find 5 onsets 621-625. These onset times have been translated to the synchronized videos 611-616. Each of the synchronized videos, 611-616, are then partitioned into sections around the start of the audio track, 620 and the onset times, 621-625. For each of these times 620-625, there is now one partitioned video from each source video, 611-616 which is used in the creation of composite video 640. For example, from time 620 to 621, each of video partitions 620 A, 620 B, 620 C, 620 D, 620 E or 620 F may be used.

According to an aspect of the present invention, the application may use any one of several techniques to select a partitioned video from the available options. For example, it may select the partitioned video: 1) Based on user input. That is, the user selects which video is selected for each time 620-625. 2) Randomly. That is, the application selects a video at random. The application may choose to use a pseudo-random number generator "seeded" with the same number each time for reproducible results. Alternatively, the application may use a "shuffle" algorithm to minimize or eliminate repeating partitions from the same video from one onset time to the next (e.g., no two consecutively selected partitions would come from the same recorded video). 3) Based on video analysis. That is, the application may analyze the videos to determine which video partitions to use. For example, the application may take into account a variety of factors such as which has the best focus at any given time, which contains the clearest view of faces, which contains motion that is most closely associated with the music, and so on. It may also use low-level features such as contrast, brightness, or image-entropy to determine which video is best. 4) Based on meta-data information from the video, such as when and where the source file was filmed or the type of location that was filmed. For example, associating video that was shot in the same type of location (e.g., a beach). Similarly, the application may associate video shot in the evening, instead of videos shot on the same calendar day. 5) Based on the creator of the video, or information about the creator of the video. For example, the application may combine videos from different users based on the gender or age of the creator. According to an aspect of the present invention, when the system determines that videos have been created by a group of friends, it may choose to prioritize—namely, using those videos created by the group of friends over other videos provided by a user not associated with the group. 6) A combination of the above. For example, the application may create a pseudo-random selection which is more likely to use videos which the user has indicated are better or more preferential (e.g., those that are liked or more pleasing to the user).

According to an aspect of the present invention, a video analysis module is part of the program to provide the analysis required for some or all of the above options. According to another aspect of the present invention, the video analysis module may be available externally, such as from a service or from the operating system. In any case, the information does not need to be created at the time of editing—it can also be created while the video is recording, or anytime after it is recorded. The video analysis module may include low-level feature detection, such as brightness, contrast or edge and corner detection, or higher-level feature detection such as entropy, motion detection or facial recognition according to an aspect of the present invention.

To build the composite video 640, the application takes the selected, partitioned synchronized videos from each onset and concatenates them. For example, when the application makes the following selections from the synchronized: 620 A, 621 B, 622 C, 623 D, 624 E, 625 F, the composite video will be made by concatenating these selected videos in order.

Figure 7:
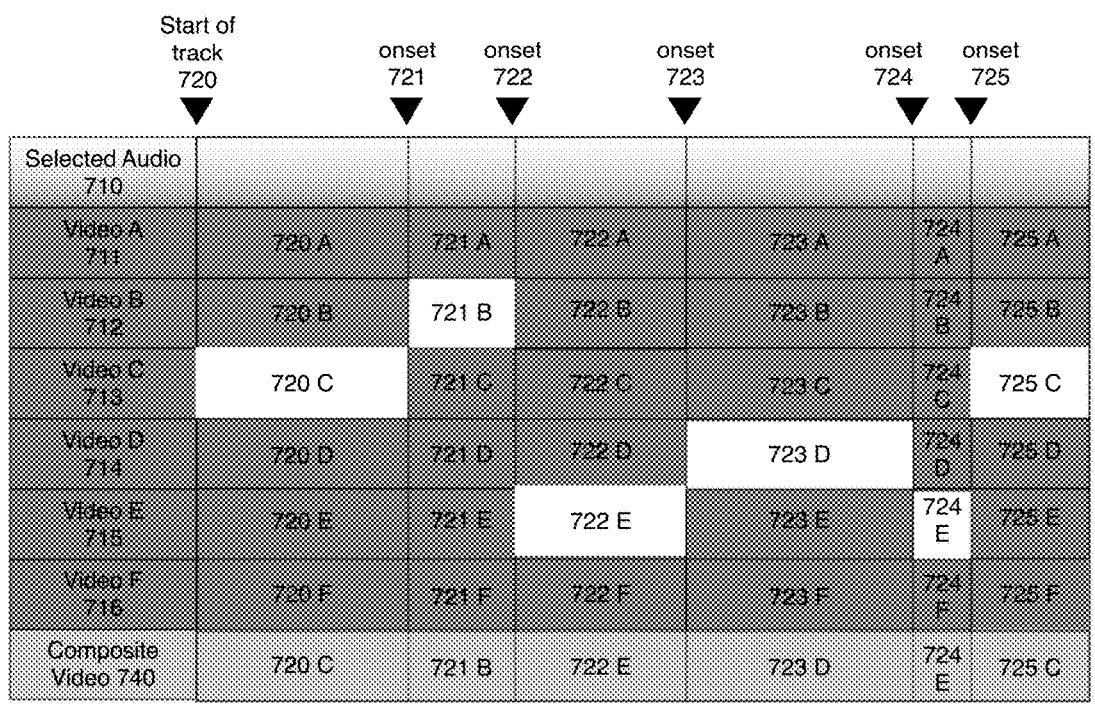
FIG. 7 is an illustration of an alternative EDL being made from the same video according to an embodiment of the invention.

FIG. 7, similar to FIG. 6, shows the use of different criteria to build a composite video 740. In this case, the application has selected 720 C, 721 B, 722 E, 723 D, 724 E, and 725 C.

In both FIG. 6. and FIG. 7, the final composite video is made by playing back the concatenated video substantially simultaneously with the selected audio.

Figure 8:
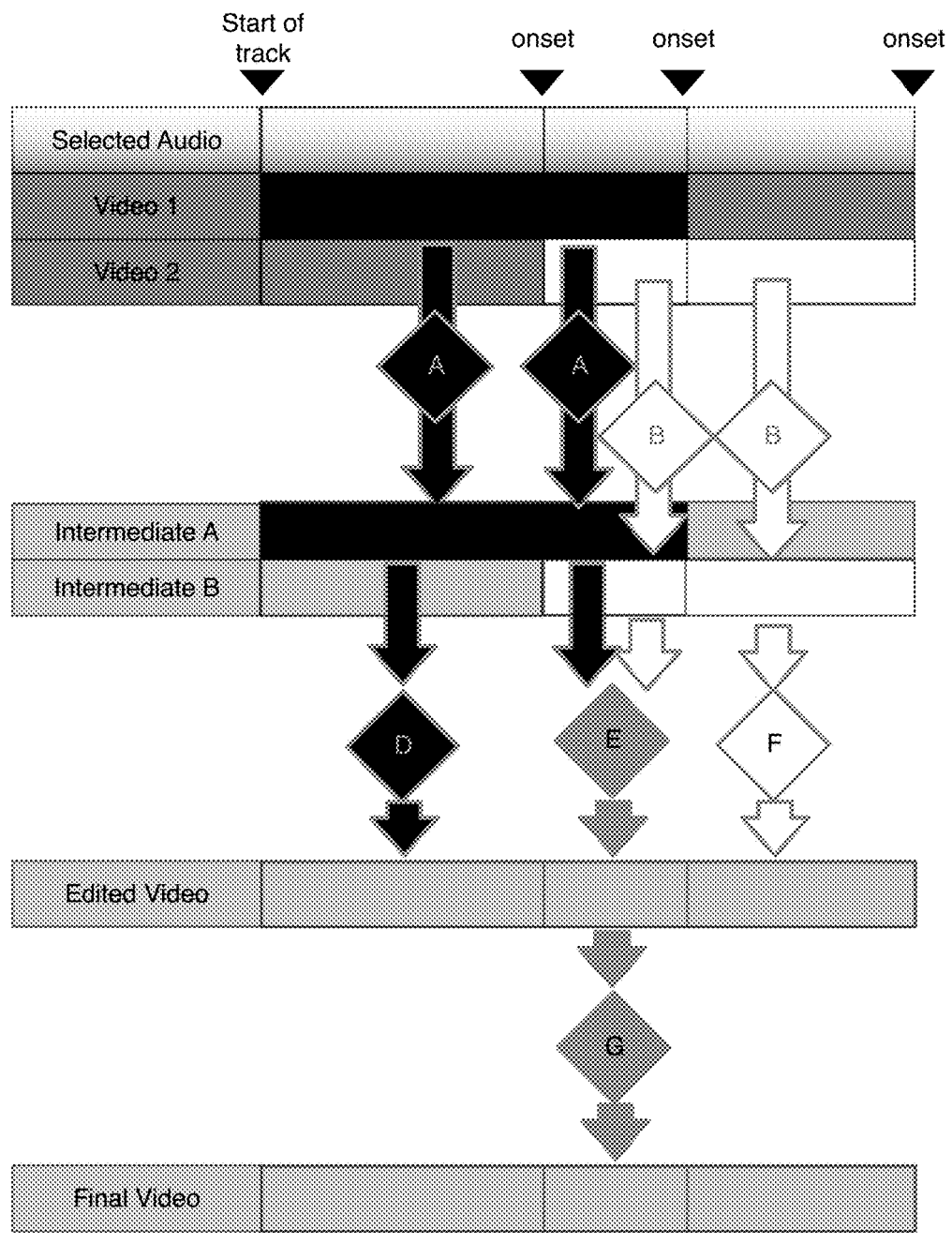
FIG. 8 is an illustration of a system for processing video in real-time according to an embodiment of the invention.

FIG. 8 shows how the steps described in FIGS. 6 and 7 allow adding effects according to an embodiment of the present invention. For simplicity, FIG. 8 shows fewer onsets (3) and fewer second media items (e.g., Videos 1 and 2). FIG. 8 shows the onsets that are used to determine the partitioning of the second media. The selection of partitions could be done according to the same options described above. Alternatively, a separate system could provide the list of partitions and partition selections—they could even be provided by a video editing environment. Once the partitioning and selection decisions are made, they are stored or transmitted as an edit decision list (EDL). Unlike FIG. 6-7, the editing performed in FIG. 8 allows some overlapping selected partitions. That is, two or more partitions may be scheduled to playback at the same time in the EDL.

In order to allow effects, which can be applied to a single second media item, or multiple second media items, some second media items may overlap in the EDL. Effects, shown in FIG. 8 as diamonds, may be added to individual second media items (e.g., A and B), or may be applied after the second media items have been combined into intermediates, such as effects D, E, and/or F. E shows where in the process two second media items are combined to produce a single output (e.g., video). This is sometimes known as a "blend" effect. Effect E is not required if none of the second media items overlap in the EDL. Examples of blends include not only cross-dissolves and cross-fades, but also picture-in-picture and other forms of effects which utilize more than one input. An effect, G, may be applied to the entire, edited, composite video to produce a final video. An example of effect G would be an effect, such as a color or contrast filter, that can help artistically unify the entire, edited video according to an aspect of the present invention. Other examples of effect G include, effects such as effects that simulate an artistic style such as drawing, painting or printing, effects that simulate a particular filming method, such as an effect that simulates an old or low-quality film camera, and effects that provide some sort of image or video overlay, such as a frame. G may also be an effect that enhances some aspect of the video, such as faces, edges, or motion. It may also be an effect designed to create something entertaining on its own, such as text, colors, moving images, "sprites," or combinations thereof. It may also include distortions such as a "bouncy" effect that moves the entire image, or a "water" effect that distorts the entire image as if it were being reflected off of water.

Effects D, E and F may also be used for this purpose, or to augment the effect G. Generally, effects A and B are used for conforming the videos to some standardized looks. This can include color correction (e.g., contrast and brightness correction) and/or rotation and scaling transforms. By keeping A and B minimal, the architecture shown in FIG. 8 can be accomplished in real-time on the mobile device 100.

According embodiments of the present invention, parameters used to control the effects in FIG. 8 change over time. These parameters may be controlled by any of the same techniques used to determine edit points and select videos, including user input, audio analysis and onset detection, random information, and video analysis and meta-data.

According to an embodiment of the present invention, the user can select one of a list of pre-determined "styles", by tapping on the button indicating its name, or corresponding image. A style represents a predetermined or user-determined set of parameters. After the user selects the desired style, the system will produce an EDL as described in FIG. 6-7. Once the EDL is built, the system is able to begin playback immediately, in that the video is partitioned and processed as shown in FIG. 8 in real-time. Provided that any required onset analysis and video metadata is already available, the EDL can be built without reference to raw media. Thus, creating an EDL can be very fast. Furthermore, the process of applying effects as shown in FIG. 8, can be done in real-time, during playback. Therefore, the entire process of editing and applying effects to a video feels instantaneous or nearly instantaneous to the user.

According to an aspect of the invention, the end user may adjust some parameters and see the results while the video is playing back. The end user is not able change the EDL instantaneously, but they can adjust parameters that only alter the effects. For example, in a style designed to simulate old fashioned movies with limited color, the end user can adjust the amount of contrast and saturation as the video is playing back.

The effects shown in FIG. 8 should not be construed to be limited to what might be considered standard video filters, such as color modification. For example, they may include text or image drawing, animation, and so on.

Synchronizing "Wild" Media

According to an embodiment of the present invention, media may be recorded that is not already synchronized to a first media item. When the media is a video, sometimes called "wild" video, it cannot be synchronized in the usual sense because there is no common timing reference. The first step to creating a synchronized media item from a wild source media (e.g., a wild video) is to find interesting times within the wild source media. These interesting times may found using one (or a combination of) the following techniques:

By analyzing the onsets in the audio of the wild source media. If the wild source media contains an audio track, the audio can be analyzed using the same techniques described above for finding onsets (e.g., the steps set forth in FIG. 3 and FIG. 4). Each resulting onset would represent an "interesting time."

By analyzing the edges or corners in the frames of the wild video. As illustrated in FIG. 9A, first, edge detection is performed on each frame of the video to produce an "edge" frame. Edge detection may be performed using any number of techniques, including Canny edge detection. Alternatively, corner detection may be employed instead of edge detection. Using either technique, every pixel is then identified as belonging to edges (or corners) or not by simple or adaptive thresholding. Second, for each pixel that is identified as being an edge in one frame, the nearest edge pixel in the next frame is found. According to an aspect of the present invention, the search for the nearest edge may be limited to some fixed distance to minimize computation requirements. Lastly, the average of all distances is found. When the average distance achieves a local minimum, that frame is marked as an interesting time.

By looking for overall change in the frames of the wild video. First, each frame is blurred. Second, each pixel of each frame is subtracted from the corresponding pixel in the following frame, and the sum of the square of the differences is found. Every local minimum is marked as an interesting frame. According to an aspect of the present invention, each frame is normalized to a standard brightness before or after blurring to achieve more consistent results. This process is illustrated in FIG. 9B. The individual pixel values in frame N are subtracted from the individual pixels in frame N+1 to produce difference frame N+1. The sum of the square of all pixels in difference frame N+1 represents the overall change for frame N+1. A relative minimum in the overall change can be marked as an interesting frame.

Once frames with interesting times (e.g., interesting frames) are found, sections of the wild source media are split (e.g., partitioned) at these times and the speed of the partitions is changed such that interesting points in the wild source media line up with onsets in the first media item. For example, in FIG. 9, the first section of the wild video is made longer to match the first media item, and the second section is made shorter.

The media that results from stretching the wild source media so that the interesting times of the wild source media match the onsets of the first media item is called a prepared source media. Once the prepared source media has been created, it may be used as a second media item, as previously described in FIG. 6, and FIG. 7.

The prepared source media may be stored on disk, or it may simply be created "on the fly" when editing or playing back. That is, information required to sync it to a first media item may be stored and the time stretching may be processed during editing along with other effects. It is not necessary for each interesting time to line up with every onset from the first media item, as depicted in FIG. 10.

Changing the speed of wild source media, when creating the prepared source media, may produce artifacts when the speed changes, making the wild source media look unnatural.

Figure 11:
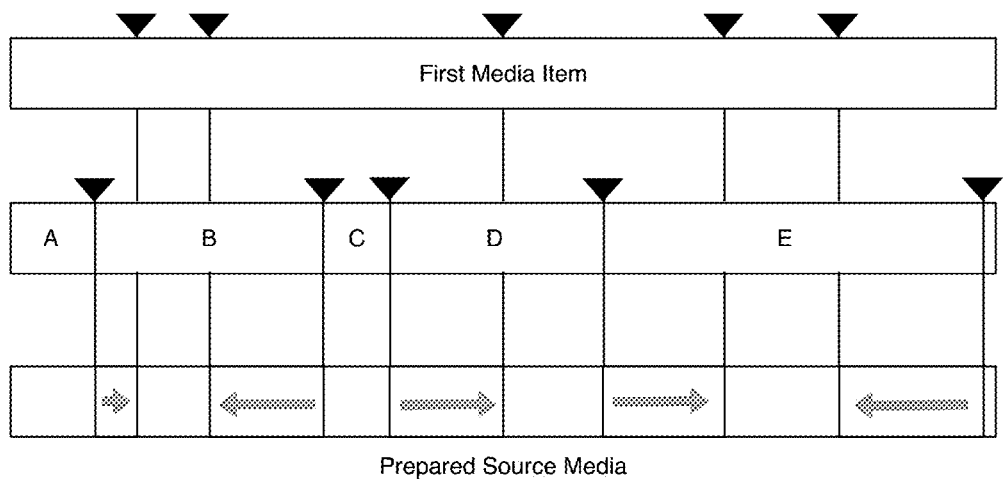
FIG. 11 is an illustration of a method of synchronizing a different "Wild" Source Media to a first media item according to an embodiment of the invention.

According to an aspect of the present invention, a variety of criteria can be used to limit or at least constrain these artifacts. For example, onsets or interesting times on the wild source media that are not close to an onset on the first media item can be ignored to prevent extreme speed changes. Alternatively, time-stretching information can be used as metadata when editing. For example, the algorithm used to select second media item partitions (e.g., clips) may take into account how much the partition was sped up or slowed down. In this case, the application can make a determination to not use sections that have changed speed too much, include more than a certain number of speed changes, or have speed changes that diverge too much from speed changes of other selected media. For example, FIG. 11 illustrates a wild media item being synchronized to a first media item. In this case, some partitions need to be stretched more than others to conform to the interesting times in the first media item. In this example, partitions B and E need to be compressed significantly, while partition C needs to be expanded significantly. Partition D, however, only needs to be shifted, so an application may opt to use partition D, but not partitions B, C or E. According to a further aspect of the present invention, the application can combine this information with user input, so, for example, the user can select how much speed changing is permissible. This might determine, for example, whether or not partition A, in FIG. 11, is included in the composite video.

According to another aspect of the invention, and in the case of wild source media, there is often no need to maintain the order of playback when editing. Therefore, speed changes may occur even more readily than shown in FIG. 10-11. For example, if interesting times/onsets from the end of the first media item match interesting times/onsets from the beginning of the wild video with very little speed changes, it may be possible to move only that partition of the wild source media, thus creating a prepared source media that is out of order. According to yet another aspect of the present invention, this technique is used as a means of reducing speed changes and improving the quality of the resulting composite and/or final video.

Editing and Creating Collaboratively

According to an embodiment of the present invention, it is not necessary for all the second media items to be produced by one user or one device, only that all the second media items are synchronized to the same first media item. Therefore, multiple users, using multiple devices, can produce a composite video collaboratively with very little effort. The resulting composite video is artistically unified and compelling.

Figure 12:
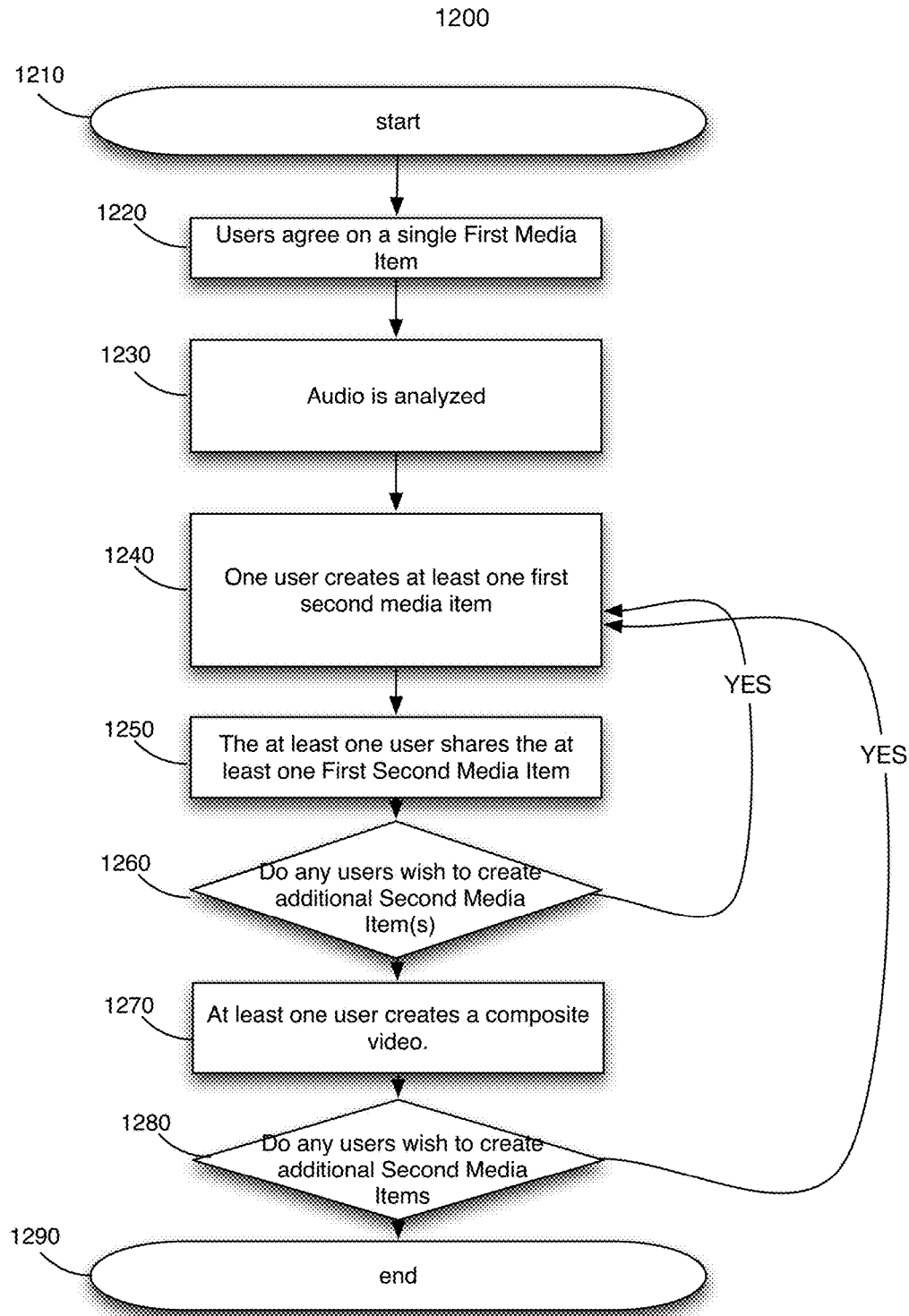
FIG. 12 is a process flow diagram of Source Media being created collaboratively, and edited automatically according to an embodiment of the invention.

According to an embodiment of the present invention, a method for editing collaboratively is shown in FIG. 12. At 1210, the process starts. At 1220, several users agree on a single first media item. This may happen in any way, for example, one user may choose a first media item, they may discuss it and agree, or the system or system managers may select a first media item for them. According to another embodiment of the present invention (not shown), a given set of users do not have to "agree" on a specific first media item. Instead, a specific first media item is presented to a set of users and the users who approve of that first media item become a subset of users who continue.

At 1230, the audio of the first media item is analyzed. The audio needs to be analyzed only once; however, it could be analyzed separately by each user's device and/or by a third party. At 1240, a first user creates at least one first second media item. The at least one first second media item is created by the steps described above (e.g., by synchronizing wild source media, or recording synchronized second media items.) At 1250, the at least one first second media item is shared—that is, it is copied or transferred to the device of another user or users. According to an aspect of the present invention, the at least one first second media item is stored on a central server for access by multiple users and devices long after the original creator has completed their contributions. At this point, 1260, a second user (who need not be a different user), may create additional second media item(s). The additional second media item(s) are created in the same way the at least one first second media item was created, 1240. According to an aspect of the invention, the additional second media item(s) can be created according to any of the ways previously described. At this point, there is at least one user who has copies of at least one of the second media items. At 1270, the at least one user creates a composite video from the second media items using the steps described in FIGS. 6 and 7. Additionally, the at least one user may modify parameters and create another composite as further shown in FIGS. 6 and 7.

At 1280, users have the option of recording additional second media items and returning to the record process at 1240. These users may be the same users or new users. In the case of new users, the new users can be seen as users who now "agree" to use the first media item.

According to an aspect of the invention, it is possible for users and devices to share not just second media items, but also analysis of that media, such as facial recognition data, or parameters that the users have selected during editing, such as how much they liked the various videos. Moreover, information about the resulting composite videos may be shared to help users create better videos. For example, if several composite videos are created their popularity can be used to determine which parameters are likely to produce other high quality composite videos.

Real-Time Implementation:

The audio analysis techniques described above and as shown in FIGS. 3 and 4 can, with only a minimal amount of latency, be made "causal", using signal processing techniques according to an aspect of the present invention. This means that they can be performed without having to apply data from future frames to determine information about current frame. Therefore, the steps described above with regard to FIGS. 3 and 4 may be used to analyze audio in real-time. Thus, data produced by the audio analysis is used to control real-time video editing.

For example, live concert footage from multiple sources could be edited automatically by analyzing the live audio. The system shown in FIG. 11 shows how the audio from a live concert could be used to edit the video in real-time according to an embodiment of the present invention. Microphone, 1310, provides the source audio. According to an aspect of the present invention, the source audio could also come from the output of a mixing board or from a pre-recorded source. One or more video sources, Camera 1320 and Camera 1321, may be generating video of the performance, the audience or some other source. The audio from the microphone 1310 is analyzed to create audio analysis data 1330, in a manner similar to the manner shown in FIGS. 3 and 4. However, the output, instead of (or in addition to) being stored, is passed as a control signal to other program modules.

Additionally, the video from the video sources is passed to video effects, 1340 and 1341, which may be controlled by the audio analysis data 1330, user input, prerecorded information or a combination thereof. The video signals from 1340 and 1341 are combined in effect/filter 1350. Effect/filter 1350 typically selects between the various inputs in the same way that video clips are concatenated, as described regarding FIGS. 6 and 7, but it may also represent a blend effect, such as a dissolve, picture in picture, or other effect that uses multiple inputs and produces a single output. Additional effects/filters 1351, may be applied to the final, composite, video before the video is output to a device such as a monitor 1360. According to an aspect of the invention, audio analysis data 1130 is just one possible source of information used by the effects, 1340, 1341, 1350, and 1351. According to a further aspect of the invention, as with the processes described in FIGS. 6, 7 and 8, the effects may use a variety of sources such as, user input, including video analysis information, operator input, random information, camera location information, and so on. The effects 1340 and 1341 perform a similar function to the effects A and B from FIG. 8: their purpose is to conform the incoming video to the format of the final video. Effect 1350 performs a similar function to the effect E from FIG. 8: blending and selecting between multiple sources. Effect 1351 performs a similar function to the effect G from FIG. 8: artistically unifying the overall video. The same comments regarding the effects, for example the types of effects, apply to FIG. 13 as to FIG. 8.

Stop Motion Animation:

Instead of requiring the user to record synchronized video, as described above and in specific regard to FIG. 2, filming video in segments is accomplished, according to another embodiment of the present invention. These segments are determined by the onsets found in the selected audio. Once the segments are determined, the video may be filmed by allowing the user to create one video for each segment and concatenating the videos. According to an aspect of the present invention, the user takes a photo for each segment instead of a video, allowing for music-synchronized stop motion animation to be easily created. According to another aspect of the present invention, a video is created first, and then the video is stopped at each onset. This gives the user a chance to mimic the video frame with a photo, which is then played back instead of the original video, creating an advanced stop-motion effect.

Simulating Stop Motion Animation from Wild Video:

Stop-motion may be simulated from wild video by freezing a wild video at onset times, as described above, according to an embodiment of the present invention.

Any reference, from above, regarding a user selects an audio track to be used as a first media item is not meant to be so limiting. According to an embodiment of the invention, the user selects video media and uses the video's audio track as a first media item. Visual portions of the first media item may be discarded or treated as synchronized video. This may create interesting or desirable effects even if the audio track contains no video because audio onsets often correspond to actions or motions in the video.

Additionally, and according to an aspect of the present invention, video that does not contain audio can be used as a first media item. This is accomplished by analyzing the video for interesting times in the same manner as described above, and using those times in the same way as audio onsets.

Applicant considers all operable combinations of the embodiments disclosed herein to be patentable subject matter. The possibilities and numerous manners in which conflicts may be handled may depend on the software and document designs used, and some modifications of the methods described herein would be within the scope of one of ordinary skill in the art.

It will be appreciated by those skilled in the field of the invention that various modifications and changes can be made to the invention without departing from the spirit and scope of this invention. Accordingly, all such modifications and changes fall within the scope of the appended claims and are intended to be part of this invention.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claim.

The invention claimed is:

1. A method for editing media comprising;
    determining a plurality of onsets within a first media item;
    obtaining and recording a plurality of second media items;
    partitioning the plurality of second media items based upon the plurality of onsets from the first media item; and
    creating a composite media file by selecting and combining in series a plurality of the partitions from the plurality of second media items based at least in part upon the determined onsets
    wherein determining a plurality of onsets within the first media item comprises:
        obtaining the first media item and partitioning it into a plurality of frames;
        converting information from within the plurality of frames from the time domain into the frequency domain;
        determining a magnitude, in the frequency domain, for each frequency band within each frame;
        filtering each magnitude using a first set of filters and a second set of filters;
        determining an onset has occurred within a frequency band of each of the plurality of frames by comparing outputs of the first and second set of filters; and
        determining an onset has occurred within a frame of the plurality of frames based in part on the determination that at least one onset has occurred within a frequency band of that frame by the comparison of the outputs of the first and second set of filters.

2. The method for editing media of claim 1;
    wherein the first media item is an audio media item.

3. The method for editing media of claim 1;
    wherein the first set and second set of filters are low pass filters; and
    wherein the first set of filters decays faster than the second set.

* * * * *